United States Patent
Chun et al.

(10) Patent No.: US 10,276,084 B2
(45) Date of Patent: Apr. 30, 2019

(54) CIRCUIT HAVING A VARIABLE OUTPUT AND A CONVERTER CONTROLLER INCLUDING SAME

(71) Applicants: HYUNDAI MOTOR COMPANY, Seoul (KR); KIA MOTORS CORPORATION, Seoul (KR)

(72) Inventors: Shin Hye Chun, Gwangyang-si (KR); Dong Gyun Woo, Suwon-si (KR); Gyu Tae Choi, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/614,341

(22) Filed: Jun. 5, 2017

(65) Prior Publication Data

US 2018/0130398 A1    May 10, 2018

(30) Foreign Application Priority Data

Nov. 4, 2016    (KR) .......................... 10-2016-0146611

(51) Int. Cl.
*H02M 3/156*    (2006.01)
*H02M 3/158*    (2006.01)
(Continued)

(52) U.S. Cl.
CPC .............. *G09G 3/2011* (2013.01); *G05F 1/40* (2013.01); *G06F 13/12* (2013.01); *G06F 13/124* (2013.01);
(Continued)

(58) Field of Classification Search
CPC ................. H02M 3/156; H02M 3/158; H02M 2001/0025; G05F 1/40; G05F 1/461; G05F 1/465
See application file for complete search history.

(56) References Cited

U.S. PATENT DOCUMENTS

2009/0160416 A1*    6/2009    Kawagishi ............ H02M 3/156
                                                        323/288
2014/0077779 A1*    3/2014    Cheng .................... H02M 3/156
                                                        323/282
(Continued)

FOREIGN PATENT DOCUMENTS

KR    1020100027931 A    3/2010
KR    1020130083536 A    7/2013

*Primary Examiner* — Timothy J. Dole
*Assistant Examiner* — Sisay G Tiku
(74) *Attorney, Agent, or Firm* — Lempia Summerfield Katz LLC

(57) ABSTRACT

A circuit has a variable output that changes an output of a fixed input inversion amplification circuit, which includes a first operation amplifier with one input terminal that is applied with a fixed input value. The circuit includes an intermediate inversion amplification circuit having a second operation amplifier with an output terminal that is connected to another input terminal of the operation amplifier included in the fixed input inversion amplification circuit. One input terminal of the second operation amplifier is applied with the same input value as the fixed input value applied to the one input terminal of the first operation amplifier. Another input terminal of the second operation amplifier is applied with a variable input corresponding to an output of the first operation amplifier.

5 Claims, 3 Drawing Sheets

(51) Int. Cl.
- *G05F 1/40* (2006.01)
- *G05F 1/46* (2006.01)
- *G09G 3/20* (2006.01)
- *G06F 13/12* (2006.01)
- *H04N 5/357* (2011.01)

(52) U.S. Cl.
CPC ........... *H02M 3/156* (2013.01); *H02M 3/158* (2013.01); *H04N 5/357* (2013.01)

(56) References Cited

U.S. PATENT DOCUMENTS

| 2015/0116140 A1* | 4/2015 | Ide ..................... H03M 1/442 |
| | | 341/122 |
| 2016/0336930 A1* | 11/2016 | Matsuno ................. H03K 5/02 |
| 2017/0151877 A1* | 6/2017 | Chun .................. B60L 11/1811 |
| 2017/0153279 A1* | 6/2017 | Chung ............... G01R 19/0007 |

\* cited by examiner

CIRCUIT HAVING A VARIABLE OUTPUT AND A CONVERTER CONTROLLER INCLUDING SAME

CROSS REFERENCE TO RELATED APPLICATION

The present application claims priority to and the benefit of Korean Patent Application No. 10-2016-0146611, filed on Nov. 4, 2016, the entire contents of which are incorporated herein for all purposes by this reference.

BACKGROUND

1. Field of the Disclosure

The present disclosure relates to a circuit having a variable output and to a converter controller including the circuit, and more particularly, to a circuit having a variable output.

2. Description of the Related Art

Environmental-friendly vehicles driven using electric energy stored in a battery include an electric vehicle, a hybrid vehicle, or the like adopt a DC converter for converting power stored in the battery into a desired level of voltage. While these environmental-friendly vehicles are becoming gradually popular and technology development thereof has been continuously conducted, the demand for a size reduction in the DC converter, or the like has increased.

While research for topology of DC converters and for power components made of new materials has progressed, the topology used to implement DC converters has been gradually transferred from early phase shifted full bridge (PSFB) topology to active clamp forward (ACF) topology. The ACF topology may reduce the number of power semiconductors at the same power, compared to the PSFB. Thus, the ACF topology has an advantage of reducing the size and the cost of such DC converters. Further, the ACF topology is more suitable for high power, such as DC converters for vehicles, in that a silicon carbide (SiC) technology is applied to the power semiconductor and thus an increase in switch loss against a large current is minimal.

In the converter to which various topologies are applied, a digital or analog scheme may be applied to control the output of the converter. Meanwhile, the converter adopts a scheme for controlling the on/off state of one or more switching elements applied as a power semiconductor element. A control circuit has been manufactured by selecting a commercial integrated element for control suitable for a converter circuit designed to generate a control signal for controlling the on/off state of the switching element or elements.

As the control scheme is applied to the converter circuit, a control technique is applied for feeding back an output of the converter circuit to compare a voltage command input from an external upper controller, or the like, in order to make the fed back voltage to follow up the voltage command that has been applied. In other words, for an efficient charging and discharging control of the battery or to obtain an increase in fuel efficiency of the vehicles, the environmental-friendly vehicles need to change and apply a voltage command. Therefore, the vehicles may have to variably control the output of the converter depending on the voltage command.

The commercial integrated element used to control the converter circuit does not often have a structure for changing the voltage command compared with the feedback voltage. In particular, the first input terminal of the operation amplifier in the integrated element provided to be compared with the feedback voltage is applied with a voltage having an already fixed value. Thus, it may be very difficult to variably control the output of the converter depending on the variable voltage command.

The contents described as the related art have been provided only for assisting in the understanding for the background of the present disclosure and should not necessarily be considered as corresponding to the related art known to those having ordinary skill in the art.

SUMMARY

An object of the present disclosure is to provide a circuit having a variable output capable of changing an output of an inversion amplification circuit having an operation amplifier with one input terminal that is applied with a fixed input value to a desired value. Another object of the present disclosure is to provide a converter controller including the circuit.

According to an embodiment of the present disclosure, a circuit has a variable output changing an output of a fixed input inversion amplification circuit including a first operation amplifier with one input terminal that is applied with a fixed input value. The circuit further include an intermediate inversion amplification circuit configured to have a second operation amplifier with an output terminal that is connected to another input terminal of the first operation amplifier included in the fixed input inversion amplification circuit. One input terminal of the second operation amplifier is applied with the same input value as the fixed input value applied to the one input terminal of the first operation amplifier. Another input terminal of the second operation amplifier is applied with a variable input corresponding to an output of the first operation amplifier.

The fixed input inversion amplification circuit may include a first resistor connected between the other input terminal of the first operation amplifier and the output terminal of the second operation amplifier and may include a second resistor connected between the other input terminal of the first operation amplifier and the output terminal of the first operation amplifier. The first resistor and the second resistor may have the same resistance value. The intermediate inversion amplification circuit may include a third resistor connected between the other input terminal of the second operation amplifier and a terminal to which the variable input is applied and may include a fourth resistor connected between the other input terminal of the second operation amplifier and the output terminal of the second operation amplifier. The third resistor and the fourth resistor may have the same resistance value.

The circuit may further include a control value generation circuit configured to have one input terminal applied with a control command value and the other input terminal applied with a control feedback value. The control value generation circuit may also be configured to output an error value corresponding to a difference between the control command value and the control feedback value to provide the error value to the other input terminal of the second operation amplifier as the variable input.

According to another embodiment of the present disclosure, a converter controller controls a magnitude of an input current by being fed back with the output voltage to perform a control to make a magnitude of an output voltage to follow up a voltage command. The converter controller includes a fixed input inversion amplification circuit configured to include a first operation amplifier that has one input terminal applied with a fixed input value and that is provided with an output as a current command for controlling the magnitude of the input current. The converter controller also includes an intermediate inversion amplification circuit configured to have a second operation amplifier that has an output terminal connected to another input terminal of the first operation amplifier included in the fixed input inversion amplification circuit. The second operation amplifier also has one input terminal provided with the same value as the fixed input value. The converter controller further has a voltage comparison circuit configured to include a third operation amplifier that has one input terminal applied with the voltage command, another input terminal fed back with the output voltage, and an output terminal connected to another input terminal of the intermediate inversion amplification circuit to output an error value corresponding to a difference between the voltage command and a value fed back with the output voltage.

The fixed input inversion amplification circuit may be included in an integrated circuit for switch driving, i.e., controlling the switching element or elements. The integrated circuit may be previously manufactured, i.e., configured, controlled, or programmed to be applied with the magnitude of the input current and to compare the input current with the current command to generate a pulse width modulation (PWM) signal for controlling a switching element or elements of the converter.

The fixed input inversion amplification circuit may include a first resistor connected between the other input terminal of the first operation amplifier and the output terminal of the second operation amplifier and may include a second resistor connected between the other input terminal of the first operation amplifier and the output terminal of the first operation amplifier. The first resistor and the second resistor may have the same resistance value. The intermediate inversion amplification circuit may include a third resistor connected between the other input terminal of the second operation amplifier and a terminal to which the variable input is applied and may include a fourth resistor connected between the other input terminal of the second operation amplifier and the output terminal of the second operation amplifier. The third resistor and the fourth resistor may have the same resistance value.

DETAILED DESCRIPTION

Hereinafter, a circuit having a variable output and a converter controller including the circuit according to various embodiments of the present disclosure are described in more detail with reference to the accompanying drawings.

Figure 1:
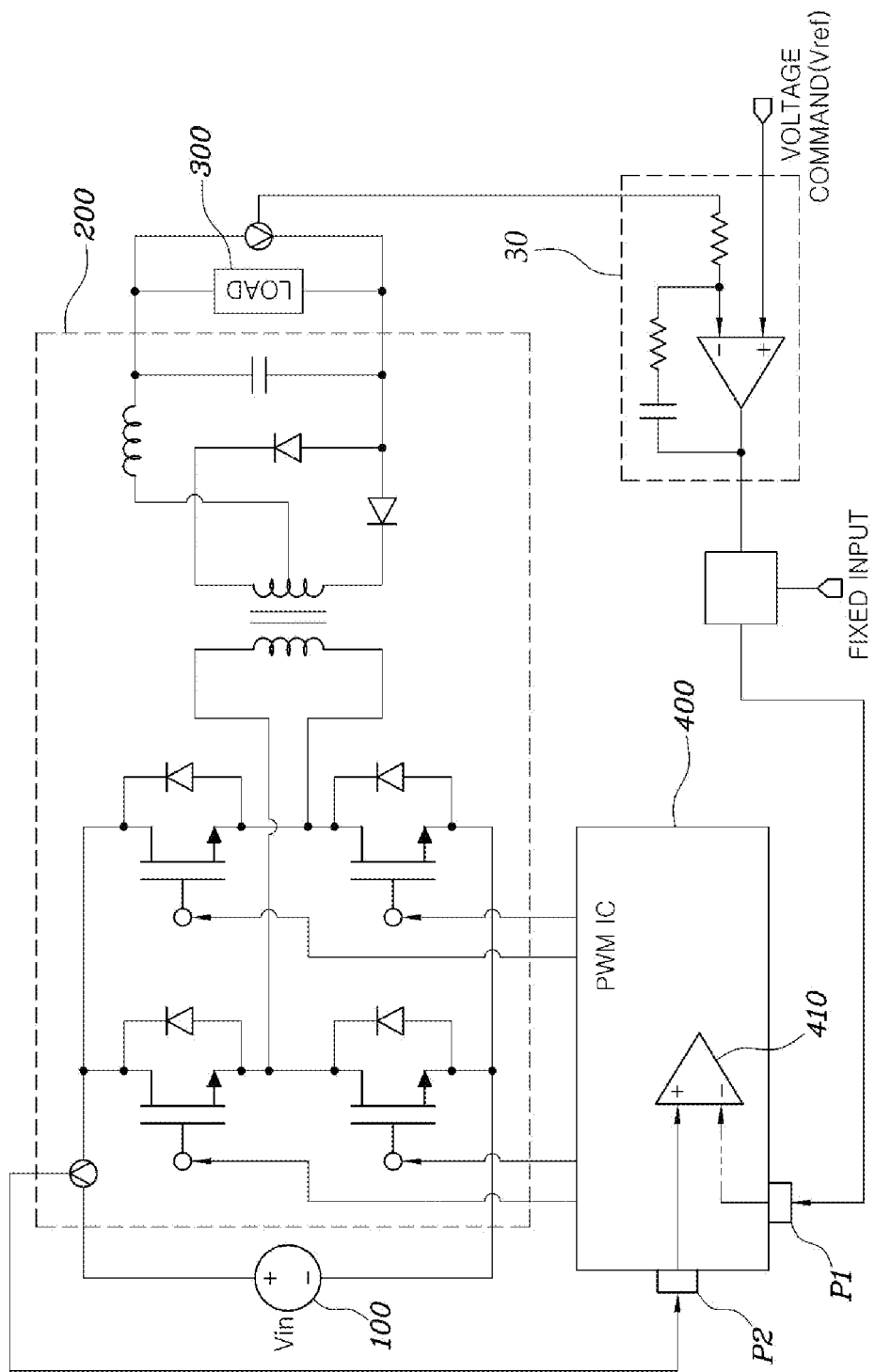
FIG. 1 is a circuit diagram illustrating a converter system to which a circuit having a variable output according to an embodiment of the present disclosure is applied.

FIG. 1 is a circuit diagram illustrating a converter system to which a circuit having a variable output is applied according to an embodiment of the present disclosure.

Referring to FIG. 1, a converter system, to which a circuit having a variable output is applied, may include a converter circuit 200 configured to convert a level of DC power provided from a power supply 100. The DC power is to be provided to a load 300 and to a pulse width modulation (PWM) integrated circuit (chip) 400. The PWM integrated circuit or chip 400 is configured to output a PWM signal that is input to gates of switching elements included in the converter circuit 200 to control an on/off state of the switching elements.

In this configuration, the converter circuit 200 may be implemented by applying a phase shifted full bridge (PSFB) topology, an active clamp forward (ACF) topology, or another topology. FIG. 1 illustrates an example of the converter circuit 200 to which the PSFB topology is applied. Whatever topology the converter circuit uses, the converter circuit 200 of the converter system, which includes an output control circuit according to the embodiment of the present disclosure, may be a converter circuit that includes one or more switching elements to control a level of an output voltage using the on/off state of the switching elements.

To control the converter circuit 200, the converter system is fed back with a current provided to the converter circuit 200 and a voltage applied from the converter circuit 200 to the load 300.

To control the converter circuit 200, the converter system includes a voltage comparison circuit 30 that compares a control or feedback voltage detecting the voltage that is provided from the converter circuit 200 to the load 300 with a control or voltage command Vref that is input from an upper controller, or the like. The comparison circuit 30 is configured to output a signal having a value corresponding to the difference between the feedback voltage and the voltage command Vref. The voltage comparison circuit 30 may be an error amplification circuit implemented by an operation amplifier that has two input terminals. One input terminal is input with the feedback voltage and another input terminal is input with the voltage command Vref. An output terminal outputs a signal corresponding to a difference between the feedback voltage and the voltage command Vref. An output of the voltage comparison circuit 30 may be provided to a first input pin P1 of the PWM integrated circuit or chip 400.

The PWM integrated circuit or chip 400 has a second input pin P2 to which a value corresponding to a feedback current detecting a current provided from the power supply (for example, a high voltage battery for a vehicle) 100 to the converter circuit 200. The PWM integrated circuit or chip 400 may compare a voltage comparison result provided to the first input pin P1 with a value corresponding to the feedback current provided to the second input pin P2. The comparison may use a comparator 410 to determine a duty cycle, or the like, of the PWM signal for controlling the switching element or elements of the converter circuit 200 based on the difference between the voltage comparison result and the value. FIG. 1 illustrates that the PWM integrated circuit or chip 400 directly provides the PWM signal to the gate or gates of the switching element or elements. The PWM integrated circuit 400 may further include an additional driving circuit generating a gate driving signal for controlling the gate or gates of the switching element or elements based on the PWM signal provided by the PWM integrated circuit or chip 400. In FIG. 1, it is to be understood that the PWM integrated circuit or chip 400 includes the driving circuit generating the gate driving signal.

Although not illustrated in FIG. 1, the PWM integrated circuit or chip 400 may include a fixed input inversion amplification circuit (see circuit 10 in FIG. 2) that has a first operation amplifier with one input terminal that is applied with a fixed input value or voltage. Anther input terminal of the fixed input inversion amplification circuit may be connected to the first input pin P1. In the case of the specific PWM integrated circuit or chip 400, even though a control signal is input to the first input pin P1, the one input terminal of the fixed input inversion amplification circuit is applied with a fixed voltage, and therefore the desired comparison results may not be obtained. In other words, the fixed input inversion amplification circuit embedded in the PWM integrated circuit or chip 400 always outputs a result that is compared with the fixed input value even though the feedback voltage, or the comparison result of the feedback voltage with the voltage command, is input to the first input pin P1 and provides the result to the comparator 410. Therefore, it is very difficult to change the desired voltage value to perform a control to output the value corresponding thereto.

Figure 2:
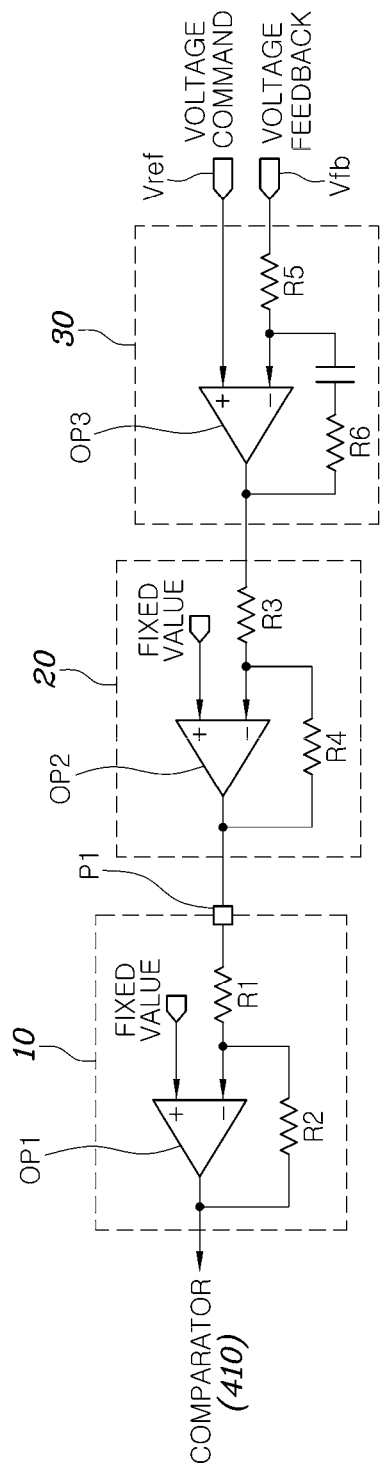
FIG. 2 is a circuit diagram of a circuit having a variable output according to an embodiment of the present disclosure.

According to an embodiment of the present disclosure, the PWM integrated circuit or chip 400, including the fixed input inversion amplification circuit, may include an intermediate inversion amplification circuit 20 illustrated in FIG. 2, to provide the desired variable input value to the first input pin P1.

FIG. 2 is a circuit diagram of a circuit having a variable output according to an embodiment of the present disclosure.

Referring to FIG. 2, the circuit having a variable output is provided to change the output of the fixed input inversion amplification circuit 10. The circuit having a variable output includes a first operation amplifier OP1 with one input terminal that is applied with the fixed input value or voltage. The circuit having a variable input also includes the intermediate inversion amplification circuit 20 having a second operation amplifier OP2 with an output terminal connected via the pin P1 to another input terminal of the operation amplifier OP1 included in the fixed input inversion amplification circuit 10.

One input terminal of the second operation amplifier OP2 of the intermediate inversion amplification circuit 20 is applied with the same input value or voltage as the fixed input value or voltage that is input to the one input terminal of the first operation amplifier OP1 included in the fixed input inversion amplification circuit. Another input terminal of the second operation amplifier OP2 may be applied with a variable input or voltage corresponding to an output of the first operation amplifier OP1 via the control circuit 200 and the load 300. In other words, the foregoing converter system may apply the output of the voltage comparison circuit 30, as depicted in FIG. 1, to the other input terminal of the second operation amplifier OP2, as depicted in FIG. 2, and in which the voltage comparison circuit 30 compares the voltage command Vref with a voltage feedback Vfb from the load 300 and outputs the comparison result.

According to the circuit structure as illustrated in FIG. 2, the output of the fixed input inversion amplification circuit 10 embedded in the PWM integrated circuit or chip 400, as illustrated in FIG. 1, is determined as the same value as the output of the voltage comparison circuit 30. In other words, the comparison result of the voltage command Vref with the voltage feedback Vfb by the voltage comparison circuit 30 may be output from the output terminal of the fixed input inversion amplification circuit 10 regardless of the fixed input of the operation amplifier OP1 in the fixed input inversion amplification circuit 10 embedded in the PWM integrated circuit or chip 400.

The result is derived by the following features of the inversion amplification circuit.

For the derivation, the input voltage of the fixed input inversion amplification circuit 10 of FIG. 2 is set to be 'Vi1' and the output voltage thereof is set to be 'Vo1'. Also for the derivation, the first resistor R1 connected between the other input terminal of the first operation amplifier OP1 and the output terminal of the second operation amplifier OP2 (i.e., the input terminal of the fixed input inversion amplification circuit 10) and the second resistor R2 connected between the other input terminal of the first operation amplifier OP1 and the output terminal of the first operation amplifier OP1 have the same value. An output voltage of the fixed input inversion amplification circuit 10 may be determined using the following Equation 1.

$$Vo1 = 2A - Vi1 \qquad \text{[Equation 1]}$$

In the above Equation 1, A represents the fixed voltage value applied to the one input terminal of the first operation amplifier OP1.

Further, for the derivation, the input voltage of the intermediate inversion amplification circuit 20 is set to be 'Vi2' and the output voltage thereof is set to be 'Vo2'. Also for the derivation, a third resistor R3 connected between the other input terminal of the second operation amplifier OP2 and the output terminal of the third operation amplifier OP3 (in other words, the input terminal of the intermediate inversion amplification circuit 20) and a fourth resistor R4 connected between the other input terminal of the second operation amplifier OP2 and the output terminal of the second operation amplifier OP2 have the same value. An output voltage of the intermediate inversion amplification circuit 10 may be determined as the following Equation 2.

$$Vo2 = 2A - Vi2 \qquad \text{[Equation 2]}$$

In the above Equations 1 and 2, if the input voltage 'Vi1' of the fixed input inversion amplification circuit 10 and the output voltage 'Vo2' of the intermediate inversion amplification circuit 20 are a voltage of a common node and therefore are equal, the output voltage 'Vo1' of the fixed input inversion amplification circuit 10 is equal to the input voltage 'Vi2' of the intermediate inversion amplification circuit 20. The input voltage 'Vi2' of the intermediate inversion amplification circuit 20 has the same value as the value of the output voltage of the voltage comparison circuit 30, such that the output voltage 'Vo1' of the fixed input inversion amplification circuit 10 is determined to be the same value as the output voltage of the voltage comparison circuit 30.

Figure 3:
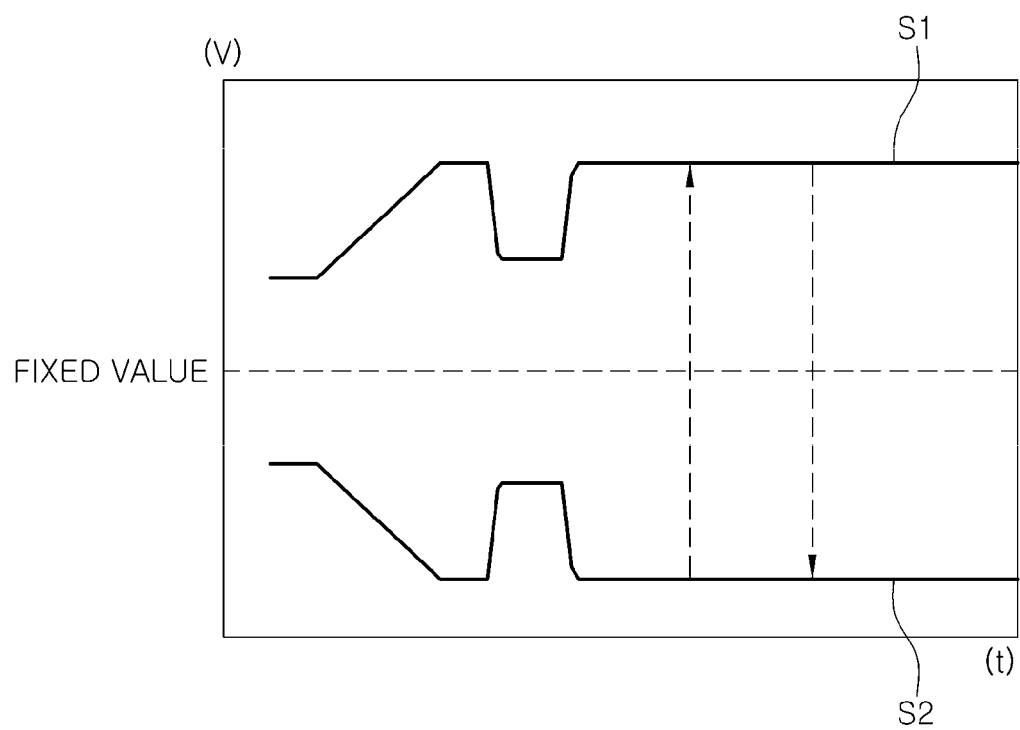
FIG. 3 is a diagram illustrating levels of the output signals of each element of the circuit of FIG. 2 having a variable output according to an embodiment of the present disclosure.

FIG. 3 is a diagram illustrating the levels of output signals of each element of the circuit having a variable output according to an embodiment of the present disclosure. FIG. 3 confirms that an output voltage S1 of the voltage comparison circuit 30 is inverted to an inversion signal S2 having a symmetrical relationship with respect to the fixed value or voltage by the intermediate inversion amplification circuit 20. The output voltage is again inverted to the symmetrical relationship with respect to the fixed value by the fixed input inversion amplification circuit 10.

As such, the comparison result of the voltage command Vref with the voltage feedback Vfb is output from the fixed input inversion amplification circuit 10 regardless of the fixed value applied to the one input terminal of the fixed input inversion amplification circuit 10. Thus, the comparison result of the voltage comparison circuit 30 changed in response to the change of the voltage command Vref is input to the comparator 410 in the PWM integrated circuit chip 400, thereby variably controlling the output of the converter circuit 200 (FIG. 1).

As described above, according to various embodiments of the present disclosure, including the variable output circuit and the converter controller having the circuit, although the inversion amplification circuit having the fixed input is implemented in the state in which it may not modify the circuit itself, such as the PWM integrated circuit, the output of the inversion amplification circuit having the fixed input may be changed to the desired value.

These features may be used for DC-DC converters applied to eco-friendly vehicles, or the like. In the case of converters for vehicles, to promote efficient charging/discharging control (over-discharging/overcharging prevention of the battery, or the like) of the auxiliary battery and to promote an increase in fuel efficiency of the vehicles, the charging voltage of the battery is changed and used, depending on the driving state, the electric field load, the charging state of the battery, the surrounding temperature, or the like. Therefore, the converter of eco-friendly vehicles needs to change the output voltage to various levels.

Therefore, according to various embodiments of the present disclosure, the output of the converter may be easily changed depending on the desired voltage command in the circuit structure in which the input is determined in the state in which the circuit itself, such as the PWM integrated circuit, may not be modified. When the gain meeting the maximum voltage requirement of the PWM integrated circuit is selected, the disclosed variable output circuit and the converter controller including the circuit may be used even as the limiter.

According to the disclosed variable output circuit and the converter controller having the circuit, although the inversion amplification circuit having the fixed input is implemented in the state in which it may not modify the circuit itself, like the PWM integrated circuit, the output of the inversion amplification circuit having the fixed input may be changed to the desired value.

Therefore, when the disclosed variable output circuit and the converter controller including the circuit are applied to vehicles, the charging voltage of the battery may be changed depending on the driving state, the electric field loads, the charging state of the battery, the surrounding temperature, or the like. This promotes efficient charging and discharging control (over-discharging/overcharging prevention of the battery, or the like) of the battery for vehicles, the increase in fuel efficiency of the vehicle, or the like.

In addition, when the gain meeting the maximum voltage requirements of the PWM integrated circuit is selected, the disclosed variable output circuit and the converter controller including the circuit may also be used even as the limiter.

Although the present disclosure has been shown and described with respect to specific embodiments, it will be obvious to those having ordinary skill in the art that the present disclosure may be variously modified and altered without departing from the spirit and scope of the present disclosure as defined by the following claims.

What is claimed is:

1. A converter controller that controls a magnitude of an input current by being fed back with an output voltage to perform a control to make a magnitude of the output voltage to follow up a voltage command, converter controller comprising:

a fixed input inversion amplification circuit including a first operation amplifier that has one input terminal applied with a fixed input value, wherein an output of the first operation amplifier is provided as a current command for controlling the magnitude of the input current;

an intermediate inversion amplification circuit having a second operation amplifier that has an output terminal connected to another input terminal of the first operation amplifier included in the fixed input inversion amplification circuit and that has one input terminal provided with the same value as the fixed input value; and a voltage comparison circuit including a third operation amplifier that has one input terminal applied with the voltage command, another input terminal fed back with the output voltage, and an output terminal connected to another input terminal of the intermediate inversion amplification circuit to output an error value corresponding to a difference between the voltage command and a value fed back with the output voltage, wherein the fixed input inversion amplification circuit is included in an integrated circuit for switch driving, the integrated circuit previously manufactured to be applied with the magnitude of the input current and to compare the input current with the current command to generate a PWM signal for controlling a switching element of the converter.

2. The converter controller of claim 1, wherein the fixed input inversion amplification circuit includes a first resistor connected between the other input terminal of the first operation amplifier and the output terminal of the second operation amplifier and includes a second resistor connected between the other input terminal of the first operation amplifier and an output terminal of the first operation amplifier, and the intermediate inversion amplification circuit includes a third resistor connected between the other input terminal of the second operation amplifier and a terminal to which a variable input is applied and includes a fourth resistor connected between the other input terminal of the second operation amplifier and the output terminal of the second operation amplifier.

3. The converter controller of claim 2, wherein the first resistor and the second resistor have the same resistance value.

4. The converter controller of claim 3, wherein the third resistor and the fourth resistor have the same resistance value.

5. The converter controller of claim 2, wherein the third resistor and the fourth resistor have the same resistance value.

* * * * *